UNITED STATES PATENT OFFICE.

MORITZ ULRICH AND JOHANN BAMMANN, OF ELBERFELD, GERMANY, ASSIGNORS TO THE FARBENFABRIKEN, VORMALS FR. BAYER & CO., OF SAME PLACE.

BLUE DYE.

SPECIFICATION forming part of Letters Patent No. 512,493, dated January 9, 1894.

Application filed September 30, 1893. Serial No. 486,908. (Specimens.)

*To all whom it may concern:*

Be it known that we, MORITZ ULRICH and JOHANN BAMMANN, doctors of philosophy, chemists, subjects of the Emperor of Germany, (assignors to the FARBENFABRIKEN, VORMALS FR. BAYER & CO., of Elberfeld,) residing at Elberfeld, Prussia, Germany, have invented a new and useful Improvement in the Manufacture of Blue Dye-Stuffs; and we do hereby declare the following to be an exact and clear description thereof.

Our invention relates to the production of so called mixed substantive dye-stuffs resulting from one molecular proportion of tetrazotized para diamins and one molecular proportion of the alkaline salt of amidonaphtholdisulfo acid ($NH_2$: $SO_3H$: $SO_3H$: $OH = 1:3:6:8$) and coupling the so formed intermediate product with one molecular proportion of naphthol or naphtholsulfo acid, for example beta naphthol or alpha naphthol monosulfo acid (1:5).

In carrying out our invention practically we proceed as follows: 24.4 parts, by weight, of dianisidin (or the corresponding quantity of another para diamin, as for example benzidin or tolidin) are converted in the well known manner with fourteen parts, by weight, of sodium nitrite into the tetrazo compound. The yellowish-brown tetrazo solution is then allowed to flow slowly on continuous stirring and carefully cooling into a solution in water of thirty-eight parts, by weight, of amidonaphtholdisulfonate of sodium with the addition of about thirty parts, by weight, of sodium acetate. The formation of the intermediate product begins immediately, and the end of the reaction is distinguishable, when a test portion taken out from the reaction mixture (after filtering off the almost insoluble intermediate product) shows no longer the characteristic reaction of tetrazo compounds viz., combination with any dye-stuff component. A solution in water of fifteen parts, by weight, of beta naphthol dissolved in a sufficient quantity of diluted soda-lye is then gradually poured into the above mixture, and a solution in water of about thirty parts, by weight, of sodium carbonate is added. The formation of the dye-stuff is facilitated by continuous stirring for about twenty-four to thirty hours. After this time the reaction mixture is heated at from about 50° to 60° centigrade, and the dye-stuff is salted out with common salt, filtered off, pressed and dried.

An analgous dye-stuff is obtained, if instead of the above fifteen parts, by weight, of beta naphthol twenty-six parts, by weight, of the sodium salt of alpha naphthol monosulfo acid ($OH$: $SO_3H = 1:5$) are employed.

The composition of the above dye-stuff from dianisidin, amidonaphtholdisulfo acid and beta naphthol is the following:

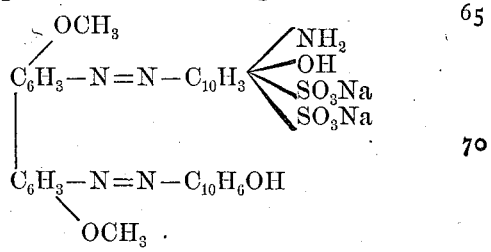

or, (when instead of beta naphthol alpha naphthol monosulfo acid is employed) a dye-stuff results which possesses the following formula:

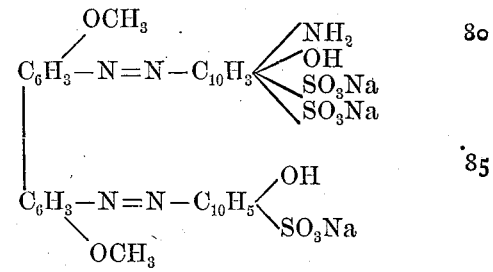

The same coloring-matters result, if inversely the tetrazo compound of dianisidin is first combined with beta naphthol or alpha naphthol monosulfo acid ($OH$: $SO_3H = 1:5$) and subsequently with amidonaphthol monosulfo acid ($NH_2$: $SO_3H$: $SO_3H$: $OH = 1:3:6:8$).

The said dye-stuffs have the following properties: They are easily soluble in cold water with a blue color. Probably the free dye stuff acids are separated in violet or blue flakes on the addition of a large excess of diluted hydrochloric or sulfuric acid to the dye-stuff solutions. Concentrated sulfuric acid (66° Baumé) dissolves the dye-stuffs with a green color, turning it into blue on the addition of ice-water to this sulfuric solution, probably the free dye-stuff acids being simultaneously separated in bluish flakes. The dye-stuffs are almost insoluble in hot alcohol. They produce on unmordanted cotton clear blue shades fast to the action of acid and alkali. When fixed on the fiber they can be diazotized and coupled with the so called developers, shades being thus produced which are fast against the action of soap.

We are aware of the patent to Gans of December 9, 1890, No. 442,369, and we do not claim the subject-matter thereof. The amido naphthol monosulfo acid referred to by Gans is the amido naphthol monosulfo acid G of the following formula:

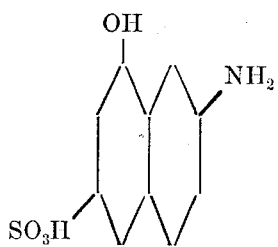

The amido naphthol disulfo acid of our application is quite another substance, and has the formula:

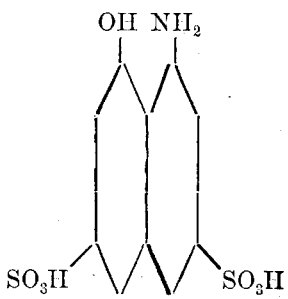

By reason of this difference our dyes are radically different from those of Gans. Our dye produces on unmordanted cotton pure blue shades; while the dye of the Gans patent produces on unmordanted cotton blue-black shades.

Having now described our invention and in what manner the same is to be performed, what we claim, and desire to secure by Letters Patent, is—

1. The process for the production of blue substantive dye-stuffs by combining one molecular proportion of a paradiamin such as dianisidin with one molecular proportion of the alkaline salt of amidonaphtholdisulpho acid ($NH_2$: $SO_3H$: $SO_3H$: $OH=1:3:6:8$) and finally coupling the so formed intermediate product with one molecular proportion of beta naphthol or alpha naphthol monosulfo acid ($OH$: $SO_3H=1:5$).

2. As a new article of manufacture the dye-stuff hereinbefore described forming a bluish-dark powder easily soluble in water, almost insoluble in hot alcohol, soluble in concentrated sulfuric acid (66° Baumé) with a green color, turning into blue on the addition of ice-water, probably the free dye-stuff acids being simultaneously separated in bluish flakes, producing on unmordanted cotton clear blue shades fast against the action of alcalies and acids.

In testimony whereof we have signed our names in the presence of two subscribing witnesses.

MORITZ ULRICH.
JOHANN BAMMANN.

Witnesses:
WILLIAM ESSENWEIN,
T. H. STRAUSS.